United States Patent
Siegenthaler

(10) Patent No.: US 9,168,676 B2
(45) Date of Patent: Oct. 27, 2015

(54) MIXING AND KNEADING MACHINE

(75) Inventor: Hans-Ulrich Siegenthaler, Suhr (CH)

(73) Assignee: BUSS AG, Pratteln (CH)

( * ) Notice: Subject to any disclaimer, the term of this patent is extended or adjusted under 35 U.S.C. 154(b) by 1551 days.

(21) Appl. No.: 11/670,065

(22) Filed: Feb. 1, 2007

(65) Prior Publication Data
US 2007/0183253 A1    Aug. 9, 2007

(30) Foreign Application Priority Data
Feb. 6, 2006   (CH) .................................. 180/06

(51) Int. Cl.
| B29B 7/42 | (2006.01) |
| B29C 47/00 | (2006.01) |
| B29C 47/38 | (2006.01) |
| B29C 47/44 | (2006.01) |
| B29C 47/66 | (2006.01) |

(52) U.S. Cl.
CPC ............. B29B 7/423 (2013.01); *B29C 47/0009* (2013.01); *B29C 47/38* (2013.01); *B29C 47/44* (2013.01); *B29C 47/667* (2013.01)

(58) Field of Classification Search
CPC ........................................................ B29B 7/423
USPC ............................................. 366/78, 289, 303
See application file for complete search history.

(56) References Cited

U.S. PATENT DOCUMENTS

| 2,505,125 | A | * | 4/1950 | List | 366/80 |
| 2,801,237 | A | * | 7/1957 | Clevy et al. | 536/69 |
| 3,023,455 | A | * | 3/1962 | Geier et al. | 425/208 |
| 3,219,320 | A | * | 11/1965 | Sutter | 366/289 |
| 3,224,739 | A | * | 12/1965 | Schuur | 366/78 |
| 3,253,818 | A | * | 5/1966 | Seddon et al. | 366/78 |
| 3,301,138 | A | * | 1/1967 | Cox | 91/221 |
| 3,346,242 | A | * | 10/1967 | List | 366/81 |
| 3,347,528 | A | * | 10/1967 | Rouner et al. | 366/75 |
| 3,367,635 | A | * | 2/1968 | Gresch | 366/80 |
| 3,458,894 | A | * | 8/1969 | Wheeler | 366/78 |
| 3,618,903 | A | * | 11/1971 | Ronner et al. | 366/289 |
| 3,788,609 | A | * | 1/1974 | Toczyski | 366/289 |
| 3,841,611 | A | * | 10/1974 | Ronner | 366/78 |
| 6,171,175 | B1 | | 1/2001 | Shaikh et al. | |
| 6,819,966 | B1 | | 11/2004 | Haeberli | |
| 7,269,471 | B2 | | 9/2007 | Kadono | |
| 7,478,977 | B2 | | 1/2009 | Osawa et al. | |
| 2005/0094486 | A1 | * | 5/2005 | Taniguchi | 366/171.1 |
| 2006/0120212 | A1 | * | 6/2006 | Taniguchi et al. | 366/118 |

OTHER PUBLICATIONS

Gordon et al., "Bernstein-Bezier Methods for the Computer-Aided Design of Free-From Curves and Surfaces", Journal of the Association for Computing Machinery, vol. 21, Apr. 1974, pp. 293-310.*

* cited by examiner

*Primary Examiner* — David Sorkin
(74) *Attorney, Agent, or Firm* — Maginot, Moore & Beck, LLP

(57) ABSTRACT

The mixing and kneading machine (1) for compounding bulk-flowable, plastic and/or pasty masses comprises a working space (9) enclosed by a casing (2), and a working member (3) moving rotatingly and translationally in the casing (2). The working member (3) comprises a plurality of kneader vanes (4). Secured to the casing (2) are kneader pins (6) which protrude into the working space (9). To optimize processing, the main surfaces of the kneader vanes (4) and/or of the kneader pins (6) are configured at least in part as main surfaces (23a-23f).

17 Claims, 4 Drawing Sheets

MIXING AND KNEADING MACHINE

Mixing and kneading machines of the kind presently involved are employed particularly for compounding bulk-flowable, plastic and/or pasty masses. For example, they serve processing viscous-plastic masses, homogenising and plasticizing plastics, admixing filler and strengthener additives as well as the production of starting materials for the food, chemical/pharmaceutical and aluminum industry. The working member of the mixing and kneading machine is usually configured as a so-called screw which forwards the material for processing axially.

In conventional mixing and kneading machines the working member merely produces a rotational motion. In addition, mixing and kneading machines are also known in which the working member rotates whilst at the same time moving translationally. The motion profile of the working member is characterized particularly by the main shaft executing a sinusoidal motion overlying the rotation. This motion profile permits casing-mounting such fitted items as kneader pins or kneader teeth. For this purpose the screw is flighted to form discrete kneader vanes. The screw flights—kneader vanes—disposed on the main shaft and the casing-mounted fitted items interact in thus creating the desired shear/mixing and kneading functions in the various processing zones. Such mixing and kneading machines of the last-mentioned kind are known to persons skilled in the art under the trade name Buss KO-KNEADER®

Hitherto, the main surfaces of the kneader vanes and pins are produced by conventional machining methods as turning, milling, electrical discharge machining, etc. In the present context, a main surface is the shell surface of a kneader vane facing a kneader pin or that of a kneader pin facing a kneader vane. The geometry of these elements materializes from an in-line arrangement of flats, radii and curves. One drawback basic to such methods of machining is that only relatively simple surface geometries can be generated, resulting in characteristic shear and extensional flow fields which produce maximum shear velocities between the moving kneader vanes and the static kneader pins at a point or line only and thus a corresponding dispersive infeed of energy into the sheared product. In other words, due to the sinusoidal axial motion of each kneader vane it is only at a line that for each shear cycle a maximum proximity of the kneader vane and kneader pin and thus a maximum shear velocity with corresponding shear deformation/energy dissipation in the product being processed. Although the objects of compounding bulk-flowable, plastic and/or pasty masses are achievable by the geometry of the main surfaces as described for many applications, it would nevertheless be desirable when additional means of influencing processing existed due to the geometry of the kneader vane and/or kneader pin. Known, for example, from EP-A 1,262,303 is a working member for a mixer and kneader vane of the kind as mentioned at the outset formed by an in-line arrangement of flats, radii and curves.

The object of the invention is thus to sophisticate a mixing and kneading machine of the kind as set forth in the preamble such that it satisfies these additional requirements in that the geometry of the kneader vanes of the screw and/or of the kneader pins can be adapted to desired properties so that, for example, an enhanced mechanical energy input and/or varying the shear and extensional flow zones generated in the working space and working the product being processed is now achievable.

For this purpose, a mixing and kneading machine in accordance with the invention is provided having a working space enclosed by a casing and a working member moving rotatingly and translationally in the casing. The machine is provided with kneader vanes and kneader pins secured to the casing and protruding into the working space. The main surfaces of the kneader vanes and/or of the kneader pins are configured at least in part as free formed surfaces.

Since the main surfaces of the kneader vanes and/or kneader pins are configured at least in part as freely formed surfaces, totally new means of influencing, for instance, the gap remaining between a kneader vane and the corresponding kneader pin are now available. In particular, the size and profile of this gap can now be varied practically at random whilst taking into account also the axial motion overlying the rotational motion.

The invention will now be detailed with reference to the drawings in which.

Figure 1:
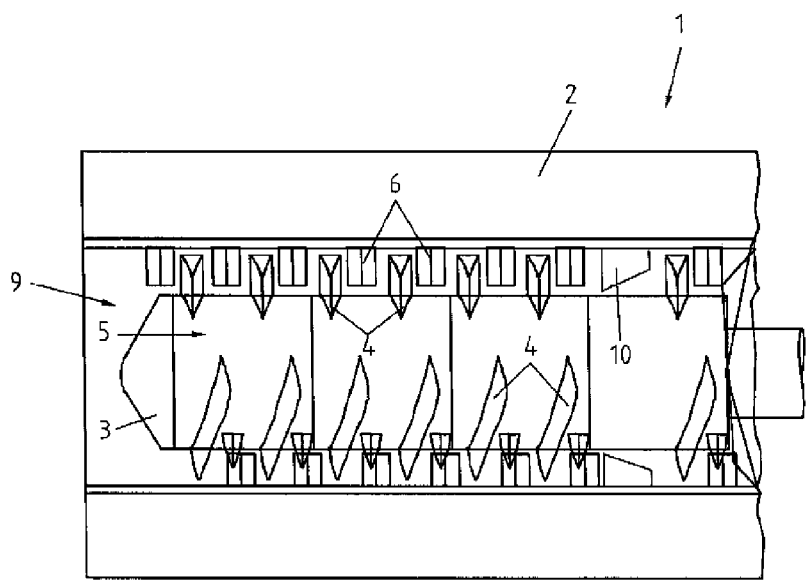
FIG. 1 is a longitudinal section through a mixing and kneading machine as shown diagrammatically.
Figure 2:
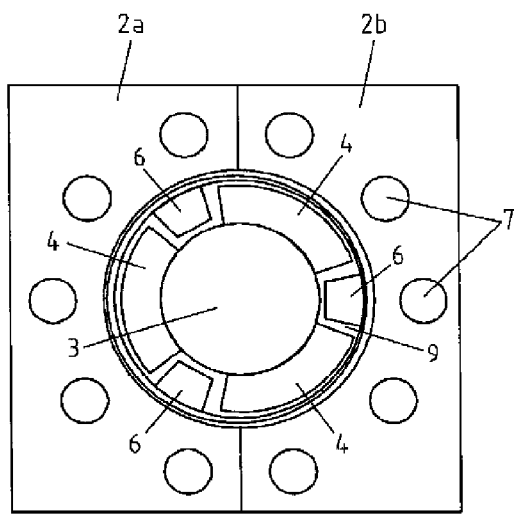
FIG. 2 is a cross-section through the mixing and kneading machine as shown diagrammatically in FIG. 1.

Referring now to FIG. 1 and FIG. 2 there is illustrated a longitudinal section and cross-section respectively through a mixing and kneading machine 1 as shown diagrammatically as an aid in explaining the type of mixing and kneading machines involved presently. The mixing and kneading machine 1 comprises a working space 9 enclosed by a casing 2, the working space 9 accommodating a rotating and translational moving working member 3. The working member 3 is provided with kneader vanes 4 configured as screw flights circumferentially to create axial passage openings 5 for the kneader pins 6 fitted to the casing 2. As evident from FIG. 2 the casing 2 preferably comprises two parts 2a, 2b provided with temperature control drillings 7. In these temperature control drillings 7 a liquid or gaseous medium circulates, serving to cool and/or heat the casing or working space. The basic configuration of one such mixing and kneading machine is known, for example, from CH 278,575.

The mixing and kneading machine 1 may in addition feature one or more baffle rings 10 by means of which the product being processed is baffled defined axial. Providing baffle rings is known, for example, from DE-A-2014693. In conclusion, the casing may be lined with wear shells (not shown) designed for facilitated replacement. Providing wear shells is known, for example, from EP-A-548,022.

Figure 3:
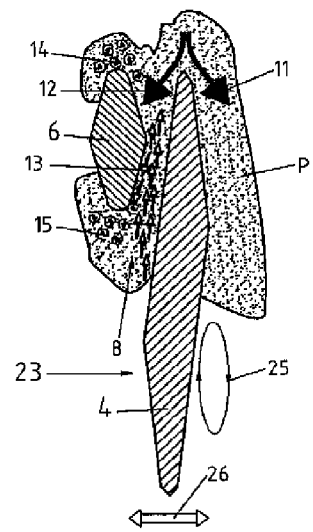
FIG. 3 is an illustration showing the characteristic shear and extensional flow zones in the product mass as caused by a kneader vane passing a kneader pin.

Referring now to FIG. 3 there is illustrated diagrammatically the characteristic shear and extensional flow zones in the product mass P as they occur in a mixing and kneading machine configured as per prior art due to a kneader vane 4 passing a kneader pin 6. The direction of rotation of the kneader vane 4 is indicated by an arrowed ellipse 25 whilst the translatory motion of the kneader vane 4 is indicated by a double arrow 26. As a result of the rotational motion of the kneader vane 4 the tip thereof distributes the product mass P as indicated by the arrows 11, 12. Between the kneader pin 6 and the main surface 23 of the kneader vane 4 and the passing kneader vane 4 facing the kneader pin 6 there exists a gap 8, the width of which varies due to the rotational and translatory motion of the working member. In this gap 8 a shear action is produced in the product mass P as is indicated by arrows 13. Both upstream and downstream of the kneader pin 6 the product mass P is relayed and reoriented as is indicated by the rotational arrows 14, 15. As already commented at the outset, maximum approximations of kneader vane 4 and kneader pin 6 and thus maximum shear velocity in the product mass P materializes only on a line because of the sinusoidal axial motion 10 of the corresponding kneader vane 4 per shear cycle.

Figure 4:
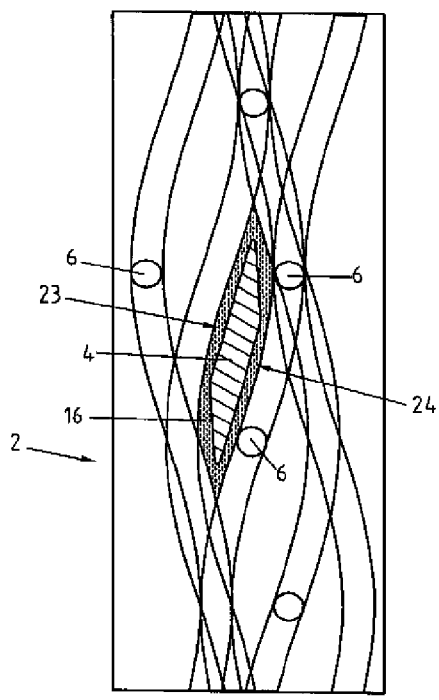
FIG. 4 is a diagrammatic illustration showing the rotational motion between a kneader pin and a conventional kneader vane.

Referring now to FIG. 4 there is illustrated simplified the motion profile of the working member in translatory motion, the inner side of the casing 2 or the shell surface of the working space being shown full length and only one single kneader vane 4 illustrated. For simplicity, the kneader pins 6 are depicted as round elements. The intention of this FIG. is to show the motion of a kneader vanes 4 designed as per prior art relative to the adjoining kneader pin 6. For a better overview, however, the motion profile is depicted kinematically reversed, i.e. it being assumed that the kneader vane 4 is stationary whilst the kneader pin 6 is moving on a sinusoidal path, resulting from the rotational motion of the working member 3 overlying the translatory motion. As evident from this FIG. there remains between the two main surfaces 23, 24 of the kneader vane 4 and the passing kneader pin 6 a gap 16, the width and profile of which is dictated by the geometry of the kneader vane 4, the associated kneader pin 6 and the axial displacement of the rotating working member 3. Since the geometrical shape of the main surfaces 23, 24 with a kneader vane 4 designed as per prior art comprises solely flats, radii and simple linear curves, the shape of the gap 16 between a kneader vane 4 and the passing kneader pin 6 can be influenced only to a limited extent, resulting in, for example, a maximum shear effect being achievable only along a line.

These shear velocities at a maximum only on a line per shear cycle were sufficient only to a certain degree hitherto in some applications to enter the shear deformations/energy dissipations into the product mass P being processed, resulting in it possibly being needed to increase the length of the working space 9 and thus also the working member 3 or the wanted result not being attained or remaining unattainable. With conventionally formed kneader vanes 4/kneader pins 6 there is no way of adapting the gap 16 and thus the free volume in the working space. The sum of the free volumes substantially influence the dwell times which accordingly also remain static. It is in any case so, that due to the restricted possibilities in designing the main surfaces 23, 24 with kneader vanes 4 designed as per prior art the gap 16 in each case meets the wanted requirements only to a certain degree, as a result of which in some cases only a suboptimum process effect is achievable.

Figure 5:
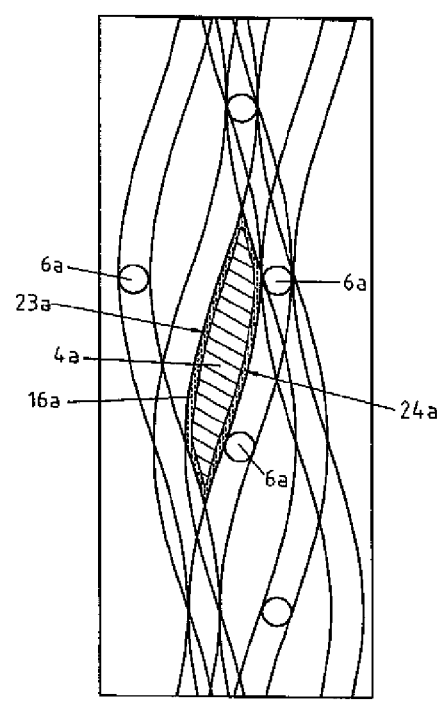
FIG. 5 is a diagrammatic illustration showing the rotational motion between a kneader pin and a kneader vane configured in accordance with the invention in a first embodiment.

Referring now to FIG. 5 there is illustrated diagrammatically the motion of the kneader pins 6 relative to a kneader vane 4a designed in accordance with the invention. The two main surfaces 23a, 24a of the kneader vanes 4 are in this case configured predominantly as freely formed surfaces and mostly adapted to the contour of the free surface defined by the sinusoidal motion path of the kneader pins 6 so that between each kneader vane 4 and the passing kneader pins 6 a free space 16a remains in the form of a uniform gap. In this case an optimized shear effect is now achieved by the gap-type free space 16a, between the main surfaces 23a, 24a of the kneader vane 4a and the passing kneader pins 6, now featuring a relatively constant width and is relatively narrow practically along each main surface 23a, 24a of the kneader vane 4a. The dimension of the gap of this free space corresponds preferably to 0.005 to 0.03 times the nominal diameter of the working member of the corresponding mixing and kneading machine.

Figure 6:
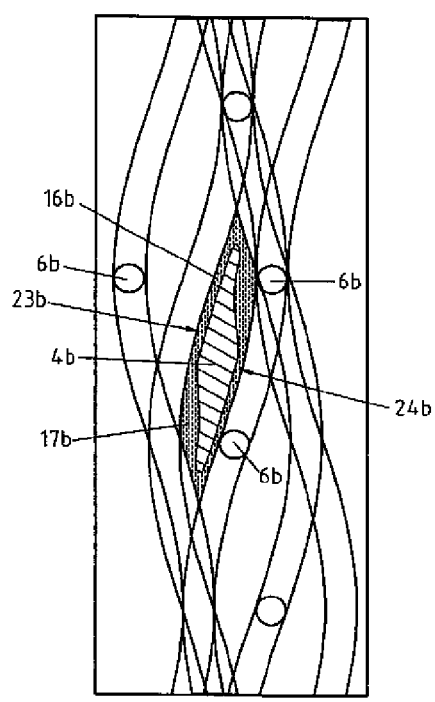
FIG. 6 is a diagrammatic illustration showing the rotational motion between a kneader pin and a kneader vane configured in accordance with the invention in a second embodiment.

Referring now to FIG. 6 there is illustrated diagrammatically the motion of the kneader pins 6 relative to a further kneader vane 4b designed in accordance with the invention. Here too, the two main surfaces 23b, 24b of the kneader vane 4b are again mainly configured as free-formed surfaces so that a uniform narrow gap 16b is followed by a flared free space 17b. The uniform narrow gap 16b forms in this case an intensive shear zone, whilst the flared free space 17b results in a defined relaxation of the mass being processed.

Figure 7:
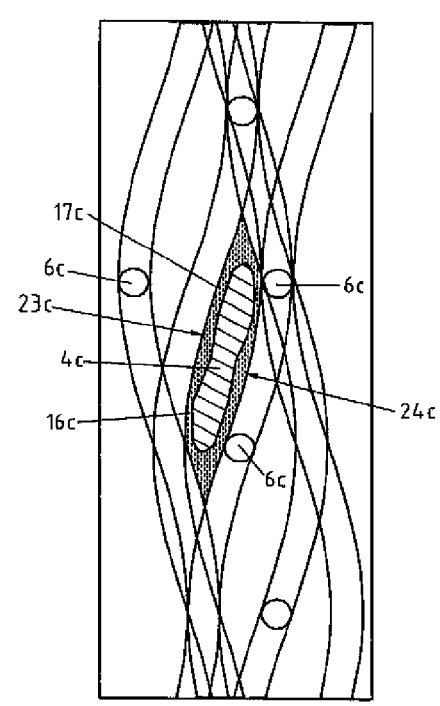
FIG. 7 is a diagrammatic illustration showing the rotational motion between a kneader pin and a kneader vane configured in accordance with the invention in a third embodiment.

Referring now to FIG. 7 there is illustrated again diagrammatically the motion of the kneader pins 6 relative to a further kneader vane 4c designed in accordance with the invention. In this example too, the two main surfaces 23c, 24c of the kneader vane 4c are again mainly configured as free-formed surfaces, the kneader vane 4c in longitudinal section having the shape of a propeller. The shape of the kneader vanes can be designed specifically—up to a "fan blade"—to satisfy a wide variety of purposes. The angle of attack, i.e. the angle between the longitudinal centerline of the kneader vane and the longitudinal centerline of the working member—of the kneader vane is now varied over a wide range. At an angle of <90° a positive conveying effect is created. At 90° a baffle effect can be practically achieved therewith. Indeed, at an angle of >90° even a return conveyance is possible. The fluid-mechanical function as described above is applicable not only to plastic masses but also to powdered substances. By its rotational/translational motion the kneader vane "ploughs" the product being processed. Rounding the tips of the kneader vanes more or less permits influencing the folding characteristic in that larger roundings tend to result more in forwards pressures, smaller more in a cutting and/or folding action of the product. Both variants and their intermediates can be made use of technically in processing: forward pressures→energy dissipation, cutting→surface renewal for wetting and/or removing gas/air from the product being processed.

Referring now to FIGS. 8, 9, 10, and 11 there is illustrated in each case a sectionwise longitudinal section through the mixing and kneading machine shown diagrammatically, each depicting a kneader vane and a kneader pin in cross-section.

Figure 8:
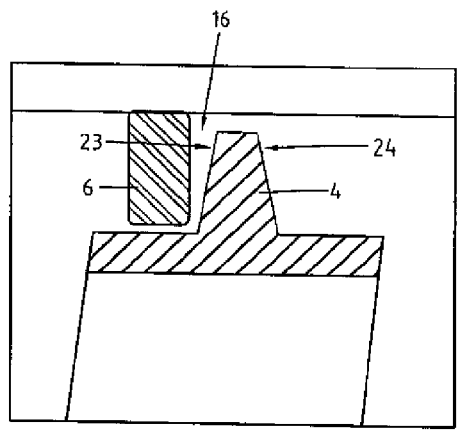
FIGS. 8 to 11 are each a sectionwise first longitudinal section through the mixing and kneading machine shown diagrammatically with differently configured kneader vanes.

Referring now to FIG. 8 there is illustrated a conventional kneader pin 6 and a conventional kneader vane 4. As evident from this illustration there remains between the main surface 23 of the kneader vane 4 and the passing kneader pin 6 a gap-type free space 16, the width and contour of which is dictated by the geometry of the kneader vane 4, the corresponding kneader pin 6 and the axial displacement of the rotating working member. Since the geometric shape of the main surface 23, 24 with a kneader vane 4 designed as per prior art comprises solely flats, radii and simple linear curves, the shape of the gap-type free space 16 between a kneader vane 4 and the passing kneader pins 6—as already commented—can be influenced only to a limited extent.

Figure 9:
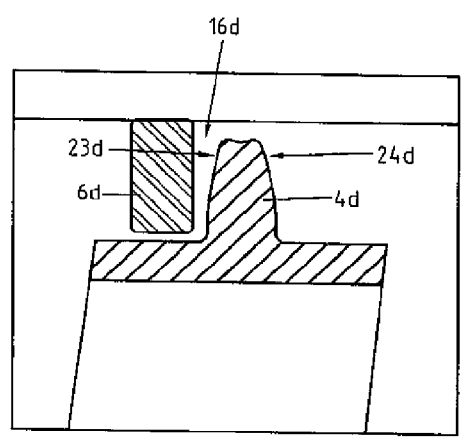

Referring now to FIG. 9 there is illustrated a conventional kneader pin 6*d* designed as per prior art with a kneader vane 4*d* designed in a first embodiment in accordance with the invention. The two main surfaces 23*d*, 24*d* of the kneader vane 4*d* feature a convex cross-section, resulting in a gap 26*d* flared upwards. This permits maintaining the shear deformation of the product being processed constant down to the full depth in motion of the screw module; the radial increasing peripheral velocities being compensated from the core diameter to the outer diameter by adapting the free space 16*d*, as a result of which the shear gap is increased radially.

Figure 10:
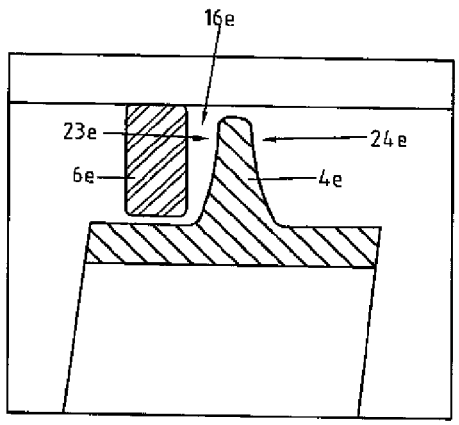

Referring now to FIG. 10 there is illustrated a kneader pin 6*e* designed as per prior art in combination with a further embodiment of a kneader vane 4*e* designed in accordance with the invention. The two main surfaces 23*e*, 24*e* of the kneader vane 4*e* feature a concave cross-section, resulting in this case too in the gap being flared upwards between the main surface 23*e* of the kneader vane 4*e* and the kneader pin 6*e*. This permits varying the shear deformation of the product being processed down to the full depth in motion of the screw module; the radially increasing peripheral velocities being compensated from the core diameter to the outer diameter by over-proportionally adapting the free space 16*e* by increasing the shear gap radially down to deeper and thus less arduous shearing actions.

Figure 11:
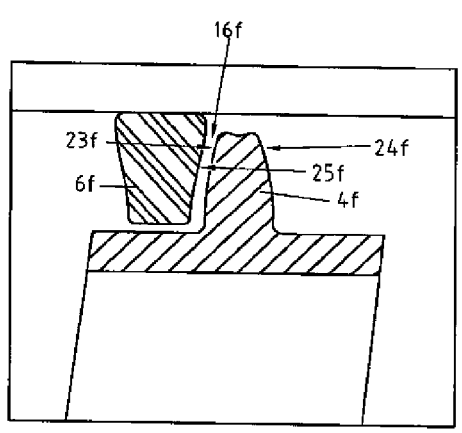
Figure 12:
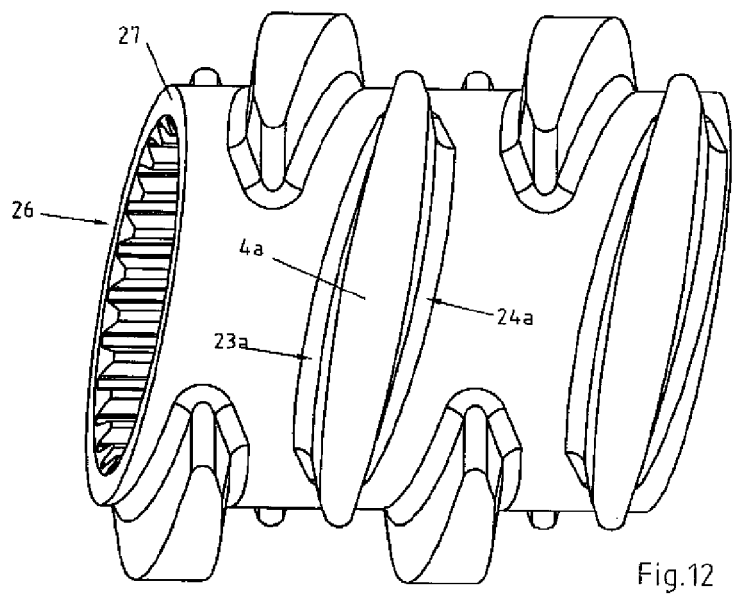
FIG. 12 is a view in perspective of a screw module featuring kneader vanes 4 configured in accordance with the invention.

Referring now to FIG. 11 there is illustrated a kneader pin 6*f* designed in accordance with the invention in combination with a kneader vane 4*f* also designed in accordance with the invention. The two facing main surfaces 24*f*, 25*f* of the kneader pin 6*f* and kneader vane 4*f* are adapted to each other such that the radial gap 26*f* between the kneader pin 6*f* and the kneader vane 4*f* is more or less uniformly narrow, resulting in an intensive shear effect in the mass being processed. This permits varying the shear deformation of the product being processed down to the depth in motion of the screw module; the radial increasing peripheral velocities from the core diameter to the outer diameter being adapted by tapering of the free space 16*f*—reduction in size of the shear gap radially—up to higher shear deformations and thus more intensive shear and dispersion actions. Referring now to FIG. 12 there is illustrated a screw module 27 comprising a plurality of kneader vanes 4*a*. The screw module 27 is provided with an inner toothing 26 and is mounted on a drive shaft (not shown). The actual working member is formed by the drive shaft and a plurality of such modules 27 mounted on the central drive shaft serving as the guiding and drive member. The basic advantage afforded by such screw modules 27 is that they can be replaced singly or in combination. In accordance with individual requirements the modules can be differently designed by, for instance, differently designing the main surfaces of the kneader vanes. Here in the present example the two side main surfaces 23*a*, 24*a* of each kneader vane 4*a* are configured as free-formed surfaces by having no natural starting point at any point.

Such modules 27 can be also put to use for zoning the mixing and kneading machine axial into differing process zones. Thus, modules having differently configured kneader vanes can be arranged in-line, whereby, of course, also the kneader pins can be corresponding adapted by, for example, their free form surfaces being configured differently.

Figure 13:
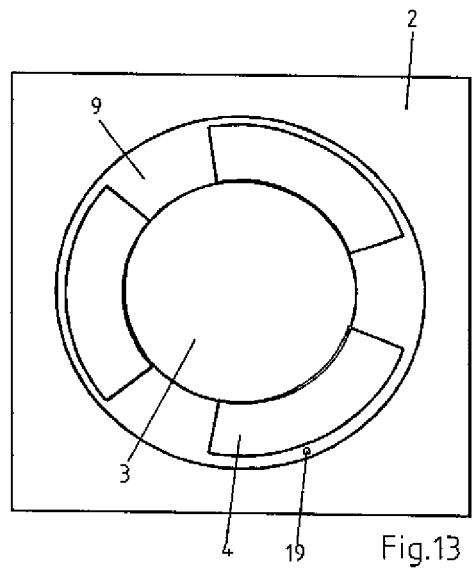
FIGS. 13 to 16 are each a cross-section through a mixing and kneading machine 1 shown diagrammatically in which the radial shell surfaces of the kneader vanes are configured differently.
Figure 14:
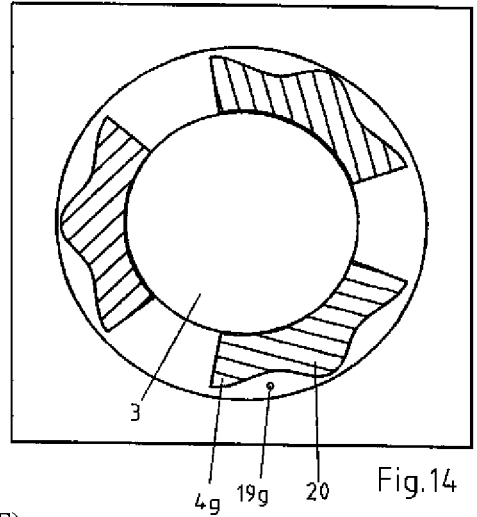
Figure 15:
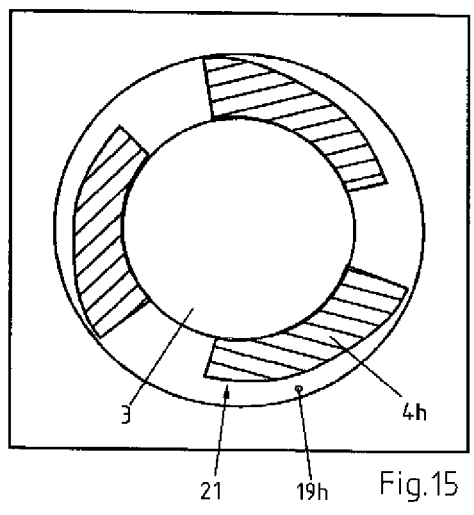
Figure 16:
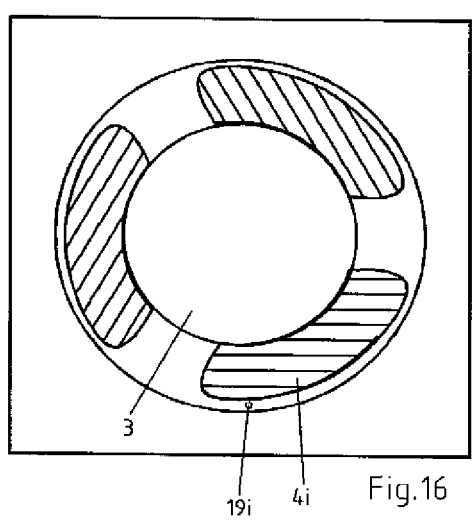

Referring now to FIGS. 13 to 16 there is illustrated in each case a cross-section through a mixing and kneading machine 1 shown diagrammatically, the working member 3 of which is provided with differently configured kneader vanes 4. These four example embodiments as shown differ particularly by the radial shell surfaces of the kneader vanes as may be formed by free form surfaces. In this arrangement FIG. 13 shows a conventional shape of a kneader vane 4 in which a uniform radial gap 19 exists between the radial shell surface of each kneader vane 4 and the inner side of the casing 2 enclosing the working space 9. In the example embodiment as shown in FIG. 14 the radial shell surface of the kneader vane 4*g* is modified by protuberance 20 in the form of a camel's hump so that a radial gap 19*g* varying in width is formed, this protuberance 20 significantly reducing the radially generated shear peaks. In the embodiment as shown in FIG. 15 the curved shell surface 21 of each kneader vane 4*h* features a changing radius so that the radial gap 19*h* continuously "breathes" for configuring radial shear and extensional flows where needed in combination with the effects as described above. In conclusion, FIG. 16 shows an example embodiment in which the starting and end portions of each kneader vane 4*i* are rounded, but the radial gap 19*i* remaining constant in width. These roundings are used to set the mixing efficiency and the long-term response of the screw module 27; the geometric shapes normally resulting from abrasive wear being emulated in thus achieving a singularly defined property profile remaining constant over its full useful life.

By designing the kneader vanes and kneader pins, namely the two side main surfaces of the each kneader vane and the main surfaces of each kneader pin, particularly the shear velocity distribution can be adapted radially. This now makes it possible, among other things, to use elements tailored in function as to mass viscosity and the absolute peripheral velocity of the working member and the kneader vanes arranged thereon respectively.

By the main surfaces of each kneader pin and/or kneader vane being configured at least in part as free form surfaces both the radial and the axial contour of the gap between each kneader pin and each kneader vane can now be influenced practically in any way needed in adapting to the wanted requirements, namely as regards the shear/mixing and kneading functions.

In addition to configuring the main surfaces of the kneader pins and/or kneader vanes also other elements of the mixing and kneading machine, of course, such as for instance the shell surface of the working member, the main surfaces of the baffle rings as well as the shell surfaces of wear shells can now be configured as free form surfaces at least in part. It is also, of course, just as possible to combine conventional surface shapes such as flat, round, spherical and simple curved surfaces with free form surfaces.

The example embodiments as described demonstrate that the present invention now makes it possible to engineer the main surfaces of the kneader vanes and/or of the kneader pins to such processing actions as conveying, shearing, melting, mixing, kneading, degassing, cooling etc. in precisely configuring, designing and fabricating them to meet the particularly object in processing.

This is the inverse of the approach hitherto in which a limited number of prescribed surface shapes were available. By combining these basic shapes the process technical requirements in each case and the conventional mechanical engineering possibilities are proximated in design and in manufacturing technology. The resulting compromises defined the limits in employing the technology hitherto. Full flexibility afforded by three-dimensional geometric design minimizes the discrepancy between theoretical, process-technical action and the reality in converting them with the latest methods (both as to design and in production technology). The invention expands in this sense the operation window of existing fields of application in thus opening up new applications hitherto not available or accessible by the full flexibility afforded by three-dimensional geometric design.

The mixing and kneading machine as described presently is particularly suitable for compounding bulk-flowable, plastic and/or pasty masses, bulk-flowable masses being understood to be, for example, powders, granulates, flakes etc, whereby this listing is not intended to be conclusive in any way.

The invention claimed is:

1. A mixing and kneading machine particularly for compounding bulk-flowable, plastic and/or pasty masses comprising:
   a working space enclosed by a casing;
   a plurality of kneader pins secured to the casing and protruding into the working space, each of said kneader pins having a pin main surface; and
   a working member disposed within said casing for rotation and translation within said working space, said working member provided with a plurality of kneader vanes each having a vane main surface facing a pin main surface to define a gap therebetween to impart a shear deformation force to the mass flowing through said gap as said working member rotates and translates,
   wherein said vane main surface of at least one of said plurality of kneader vanes is substantially non-linear in the radial direction along substantially the entire height of the vane main surface from an outer diameter of the kneader vane toward a base diameter of the kneader vane to control the shear deformation of the mass.

2. The mixing and kneading machine as set forth in claim 1, wherein:
   said gap between said at least one vane and said pin main surface has a width; and
   said vane and pin main surfaces are configured relative to each other such that said gap width remains substantially constant as said at least one kneader vane moves relative to said kneader pins as said working member rotates and translates.

3. The mixing and kneading machine as set forth in claim 2, wherein:
   said working member is substantially cylindrical with a nominal diameter; and
   said width of said gap is about 0.005 to 0.03 times said nominal diameter.

4. A mixing and kneading machine particularly for compounding bulk-flowable, plastic and/or pasty masses, comprising:
   a working space enclosed by a casing;
   a plurality of kneader pins secured to the casing and protruding into the working space, each of said kneader pins having a pin main surface; and
   a working member disposed within said casing for rotation and translation within said working space, said working member provided with a plurality of kneader vanes each having a vane main surface facing a pin main surface to define a gap therebetween to impart a shear deformation force to the mass flowing through said gap as said working member rotates and translates,
   wherein said vane main surface of at least one of said plurality of kneader vanes is substantially non-linear in at least one of the radial direction, the direction of translation of the working member and the direction of rotation of the working member to control the shear deformation of the mass,
   wherein said vane and pin main surfaces are configured so that said gap has a width that remains substantially constant as said working member rotates and translates relative to said kneader pins, and
   wherein at least part of said vane main surface of at least one kneader vane is configured as a sinusoidal surface in the direction of rotation of said working member.

5. The mixing and kneading machine as set forth in claim 4, wherein said vane main surface of said at least one kneader vane is configured entirely as a sinusoidal surface.

6. A mixing and kneading machine particularly for compounding bulk-flowable, plastic and/or pasty masses, comprising:
   a working space enclosed by a casing;
   a plurality of kneader pins secured to the casing and protruding into the working space, each of said kneader pins having a pin main surface; and
   a working member disposed within said casing for rotation and translation within said working space, said working member provided with a plurality of kneader vanes each having a vane main surface facing a pin main surface to define a gap therebetween to impart a shear deformation force to the mass flowing through said gap as said working member rotates and translates,
   wherein said vane main surface of at least one of said plurality of kneader vanes is substantially non-linear in at least one of the radial direction, the direction of translation of the working member and the direction of rotation of the working member to control the shear deformation of the mass, and
   wherein a first portion of said vane main surface of said at least one kneader vane is configured as a sinusoidal surface and a second portion of said vane main surface flares to increase the width of said gap.

7. A mixing and kneading machine particularly for compounding bulk-flowable, plastic and/or pasty masses, comprising:
   a working space enclosed by a casing;
   a plurality of kneader pins secured to the casing and protruding into the working space, each of said kneader pins having a pin main surface; and
   a working member disposed within said casing for rotation and translation within said working space, said working member provided with a plurality of kneader vanes each having a vane main surface facing a pin main surface to define a gap therebetween to impart a shear deformation force to the mass flowing through said gap as said working member rotates and translates,
   wherein said vane main surface of at least one of said plurality of kneader vanes is substantially non-linear in at least one of the radial direction, the direction of translation of the working member and the direction of rotation of the working member to control the shear deformation of the mass;
   wherein said vane main surface of said at least one kneader vane is configured as a propeller shape in the direction of rotation of said working member.

8. The mixing and kneading machine as set forth in claim 1, wherein said vane and pin main surfaces are configured so that said gap has a width that remains substantially constant in the radial direction.

9. A mixing and kneading machine particularly for compounding bulk-flowable, plastic and/or pasty masses, comprising:
   a working space enclosed by a casing;
   a plurality of kneader pins secured to the casing and protruding into the working space, each of said kneader pins having a pin main surface; and a working member disposed within said casing for rotation and translation within said working space, said working member provided with a plurality of kneader vanes each having a vane main surface facing a pin main surface to define a gap therebetween to impart a shear deformation force to the mass flowing through said gap as said working member rotates and translates, wherein said vane main surface of at least one of said plurality of kneader vanes is substantially non-linear in at least one of the radial direction, the direction of translation of the working member and the direction of rotation of the working member to control the shear deformation of the mass, and wherein each of said kneader vanes further includes a radial shell surface cooperating with said casing to define a radial gap, said radial shell surface configured so that said radial gap has a non-uniform width in the circumferential direction.

10. The mixing and kneading machine as set forth in claim 9, wherein said radial shell surface includes a protuberance.

11. The mixing and kneading machine as set forth in claim 9, wherein said radial shell surface is defined at a decreasing radius so that said radial gap has an increasing width in the circumferential direction.

12. The mixing and kneading machine as set forth in claim 9, wherein:
said at least one kneader vane includes opposite circumferential ends; and
said radial shell surface is rounded at said circumferential ends and is defined at a substantially constant radius between said rounded circumferential ends.

13. A mixing and kneading machine particularly for compounding bulk-flowable, plastic and/or pasty masses comprising:
a working space enclosed by a casing;
a plurality of kneader pins secured to the casing and protruding into the working space, each of said kneader pins having a pin main surface; and
a working member disposed within said casing for rotation and translation within said working space, said working member provided with a plurality of kneader vanes each having a vane main surface facing a pin main surface,
each of said kneader vanes further including a radial shell surface cooperating with said casing to define a radial gap, said radial shell surface configured so that said radial gap has a non-uniform width in the circumferential direction,
wherein said radial shell surface includes at least one of a decreasing radius decreasing continuously from one circumferential end of said shell surface to an opposite circumferential end of said shell surface such that said radial gap has an increasing width in the circumferential direction, and opposite rounded circumferential ends with a substantially constant radius between said ends such that said radial shell surface is defined at a substantially constant radius between said opposite rounded circumferential ends.

14. A mixing and kneading machine particularly for compounding bulk-flowable, plastic and/or pasty masses comprising:
a working space enclosed by a casing, said working space defines at least two differing process zones axially spaced along the length of said casing;
a plurality of kneader pins secured to the casing and protruding into the working space, each of said kneader pins having a pin main surface, said plurality of kneader pins distributed among said differing process zones; and
a working member disposed within said casing for rotation and translation within said working space, said working member provided with a plurality of kneader vanes each having a vane main surface facing a pin main surface, said kneader vanes distributed among said differing process zones,
wherein said kneader vane main surfaces and/or of said pin main surfaces are differently configured in said differing process zones, and
wherein said vane and pin main surfaces cooperate to define a gap therebetween, said gap having a width, said vane main surface of said kneader vanes in at least one of said differing process zones are adapted to the contour of a surface defined by a sinusoidal motion path of said kneader vanes relative to the kneader pins in said at least one of said differing process zones resulting from the rotation and translation of the working member, such that said gap width remains substantially constant as said kneader vane in said at least one of said differing process zones moves relative to said kneader pins as said working member rotates and translates.

15. The mixing and kneading machine as set forth in claim 13, the vane and pin main surfaces configured to define a gap therebetween to impart a shear deformation force to the mass flowing through said gap as said working member rotates and translates;
wherein said vane main surface of at least one of said plurality of kneader vanes is substantially non-linear in at least one of the radial direction, the direction of translation of the working member, or the direction of rotation of the working member to control the shear deformation of the mass.

16. The mixing and kneading machine as set forth in claim 14, wherein each of said kneader vanes in the at least one of said differing process zones further includes a radial shell surface cooperating with said casing to define a radial gap, said radial shell surface configured so that said radial gap has a non-uniform width in the circumferential direction.

17. The mixing and kneading machine as set forth in claim 1, wherein at least a portion of said vane main surface has a radius of curvature that varies at least along the direction of rotation of the working member.

* * * * *